United States Patent
Araki et al.

(10) Patent No.: US 12,441,428 B2
(45) Date of Patent: Oct. 14, 2025

(54) LEAN VEHICLE

(71) Applicant: AISIN CORPORATION, Aichi (JP)

(72) Inventors: Keizo Araki, Kariya (JP); Akira Mizuno, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/910,253

(22) Filed: Oct. 9, 2024

(65) Prior Publication Data

US 2025/0136232 A1    May 1, 2025

(30) Foreign Application Priority Data

Oct. 26, 2023 (JP) ................. 2023-184177

(51) Int. Cl.
  *B62K 5/10* (2013.01)
  *B62K 5/01* (2013.01)
  *B62K 5/00* (2013.01)

(52) U.S. Cl.
  CPC .......... *B62K 5/10* (2013.01); *B62K 5/01* (2013.01); *B62K 2005/001* (2013.01)

(58) Field of Classification Search
  CPC ...... B62K 5/01; B62K 2005/001; B62K 5/10; B62K 5/027; B62K 5/05; B62K 5/08; B62J 6/023
  See application file for complete search history.

(56) References Cited

U.S. PATENT DOCUMENTS 11,279,430 B1 * 3/2022 Rea .................. B60G 3/01
2020/0262262 A1 * 8/2020 Araki ............... B62K 5/02

FOREIGN PATENT DOCUMENTS

| FR | 3082783 A1 * | 12/2019 | ......... B60G 21/0555 |
| IT | 202100012131 A1 * | 11/2022 | |
| JP | 2021-160610 A | 10/2021 | |

OTHER PUBLICATIONS

Augoyard, FR-3082783-A1, Machine Translation of Specification (Year: 2019).*
Raffaelli, IT-202100012131-A1, Machine Translation of Specification (Year: 2022).*

* cited by examiner

*Primary Examiner* — Paul N Dickson
*Assistant Examiner* — Matthew Joseph Ganci
(74) *Attorney, Agent, or Firm* — Sughrue Mion, PLLC

(57) ABSTRACT

A lean vehicle includes: a plurality of wheel units provided at least at a front position and a rear position of a vehicle body and each including a pair of wheels spaced apart in a vehicle width direction; a lean unit provided in a vicinity of one of the wheel units and including a lean mechanism configured to relatively tilt the wheel unit and the vehicle body with respect to a ground in a turning inward direction and a lean drive unit configured to drive the lean mechanism; and a passive suspension provided on the other of the wheel units and configured to generate roll stiffness when the vehicle body is tilted with respect to the ground in the vehicle width direction.

3 Claims, 7 Drawing Sheets

LEAN VEHICLE

CROSS REFERENCE TO RELATED APPLICATIONS

This application is based on and claims priority under 35 U.S.C. § 119 to Japanese Patent Application 2023-184177, filed on Oct. 26, 2023, the entire content of which is incorporated herein by reference.

TECHNICAL FIELD

This disclosure relates to a lean vehicle.

BACKGROUND DISCUSSION

In the related art, various motorized vehicles for small passengers, such as small vehicles for one person, have been put into practical use as one means of easy transportation. In the case of such vehicles for small passengers, miniaturization is implemented by reducing a length of the vehicle in a front-rear direction and reducing a vehicle width. On the other hand, reducing the vehicle width tends to make it difficult to maintain vehicle stability. For example, at the time of vehicle turning, a centrifugal force generated in a turning outward direction may cause a vehicle posture to become unstable. Therefore, a lean vehicle including a lean mechanism capable of taking a balance with the centrifugal force generated in the turning outward direction at the time of vehicle turning and improving the stability of the vehicle posture by relatively tilting a vehicle body and a road surface (wheels in contact with the ground) in a vehicle width direction (a turning inward direction) depending on traveling conditions has been proposed.

Examples of the related art include JP2021-160610A.

To more widely spread the lean vehicle as described above, it is desirable to provide a simple structure in which the stable traveling performance can be maintained and stable lean posture can be implemented at the time of turning, as well as a configuration which easily realizes cost reduction.

A need thus exists for a lean vehicle which is not susceptible to the drawback mentioned above.

SUMMARY

According to an aspect of this disclosure, a lean vehicle as an example disclosed here includes: a plurality of wheel units provided at least at a front position and a rear position of a vehicle body and each including a pair of wheels spaced apart in a vehicle width direction; a lean unit provided in a vicinity of one of the wheel units and including a lean mechanism configured to relatively tilt the wheel unit and the vehicle body with respect to a ground in a turning inward direction and a lean drive unit configured to drive the lean mechanism; and a passive suspension provided on the other of the wheel units and configured to generate roll stiffness when the vehicle body is tilted with respect to the ground in the vehicle width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment and a modification disclosed here will be described with reference to the drawings. Configurations of the embodiment and the modification to be described later, as well as functions and effects brought about by the configurations, are merely examples and are not limited to the following description.

Figure 1:
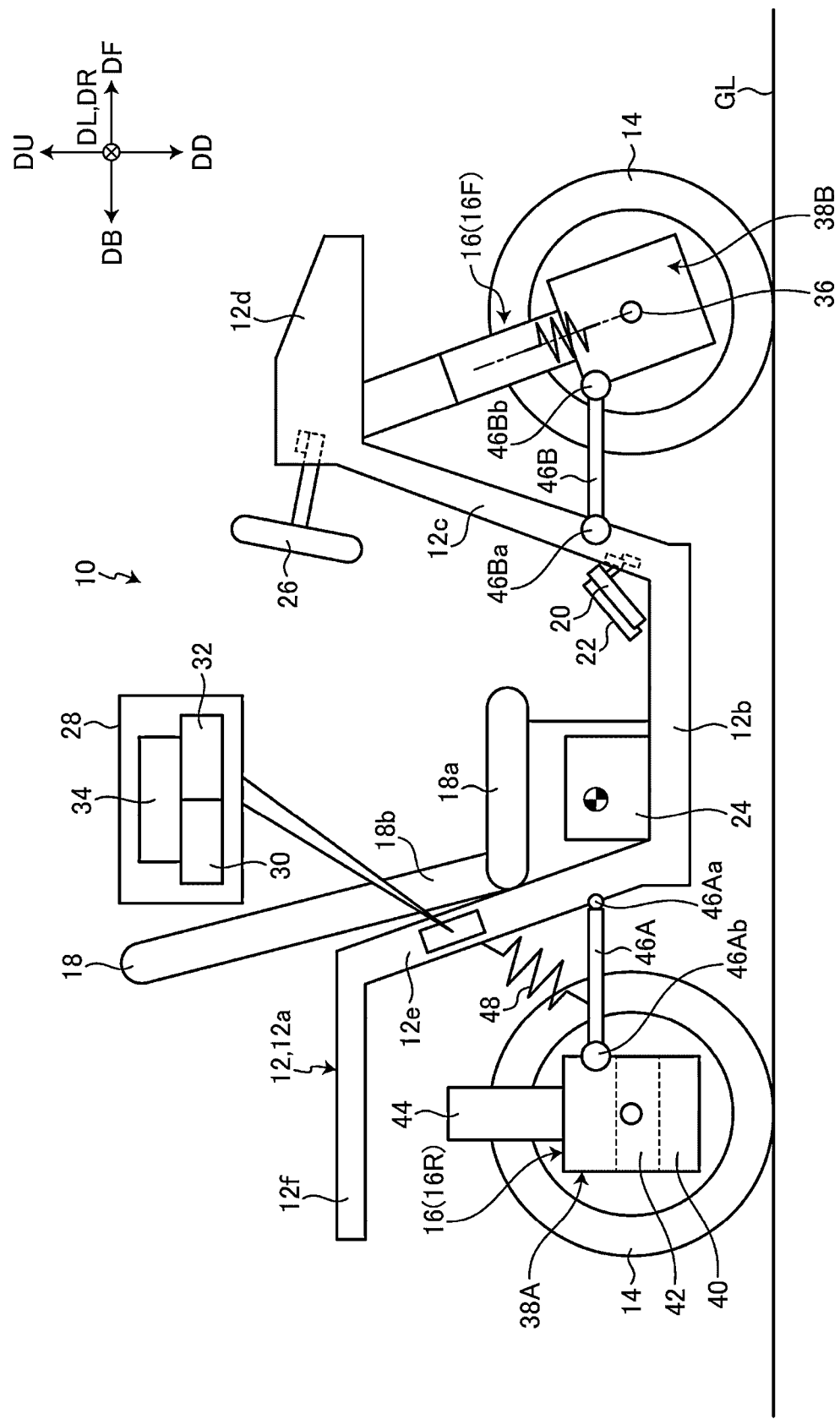
FIG. 1 is an exemplary and schematic side view illustrating a configuration of a lean vehicle according to an embodiment.

FIG. 1 is an exemplary and schematic side view illustrating a configuration of a lean vehicle 10 according to the embodiment. In the lean vehicle 10 according to the present embodiment, a lean unit is disposed on at least one wheel unit at a front position and a rear position of a vehicle body, and a passive suspension capable of generating roll stiffness is disposed on the other wheel unit. According to this configuration, compared to a vehicle including lean units in front and rear wheels, cost reduction of the lean vehicle 10 can be realized, the stable traveling performance can be maintained, and in particular, traveling stability at the time of turning can be obtained.

FIG. 1 illustrates a state in which the lean vehicle 10 is disposed on a horizontal ground GL and is not tilted. FIG. 1 illustrates a front direction DF, a back direction DB, an upward direction DU, a downward direction DD, a right direction DR, and a left direction DL. The front direction DF is a front direction (that is, an advancing direction) of the lean vehicle 10, and the back direction DB is a direction opposite to the front direction DF. The upward direction DU is a vertically upward direction, and the downward direction DD is a vertically downward direction (that is, a direction opposite to the upward direction DU). The vertically downward direction is a direction of gravity. The right direction DR is a right direction viewed from the lean vehicle 10 traveling in the front direction DF, and the left direction DL is a direction opposite to the right direction DR. Each of the front direction DF, the back direction DB, the right direction DR, and the left direction DL is a horizontal direction. The upward direction DU and the downward direction DD are, for example, perpendicular to the front direction DF.

The lean vehicle 10 according to the present embodiment is, for example, a small vehicle for one person. The lean vehicle 10 includes a plurality of wheel units 16 (a rear wheel unit 16R and a front wheel unit 16F) provided at least at a front position and a rear position of a vehicle body 12 and each including a pair of wheels 14 spaced apart in a vehicle width direction (the right direction DR and the left direction DL). That is, the lean vehicle 10 according to the present embodiment is a four-wheel vehicle. FIG. 1 is a view of the lean vehicle 10 as viewed from a right-side surface side, and illustration of the front and rear wheels 14 on the right side is omitted for ease of description of the structure.

In the lean vehicle 10 illustrated in FIG. 1, for example, the rear wheel unit 16R is a unit for driving wheels. For example, the driving wheels (wheels 14 for rear wheels) may be rotationally driven by a power transmission mechanism using a drive motor or a speed reduction mechanism or may be rotationally driven by an in-wheel motor built in each wheel 14. In contrast, the front wheel unit 16F is a non-driving wheel and is a rotating wheel that is rotatable in the vehicle width direction (that is, the right direction DR and the left direction DL) of the lean vehicle 10. A traveling direction of the rotating wheel is rotatable from the front direction DF to the right or the left. In another embodiment, the rear wheel unit 16R may be non-driving wheels, and the front wheel unit 16F may be driving wheels rotatable in a left-right direction. It is sufficient that the lean vehicle 10 includes the wheel unit 16 including the pair of wheels 14 spaced apart in the vehicle width direction at at least the front position and the rear position. For example, the lean vehicle 10 may include six or more wheels.

The vehicle body 12 includes a body portion 12a. The body portion 12a includes a bottom portion 12b, a front wall portion 12c connected to a front direction DF side of the bottom portion 12b, a front portion 12d extending from an upper end of the front wall portion 12c toward the front direction DF, a rear wall portion 12e connected to a back direction DB side of the bottom portion 12b, and a rear portion 12f extending from an upper end of the rear wall portion 12e toward the back direction DB. The body portion 12a includes, for example, a metal frame and a panel fixed to the frame.

The vehicle body 12 further includes a seat 18 fixed on the bottom portion 12b, an accelerator pedal 20 and a brake pedal 22 disposed on a front direction DF side of the seat 18, a control device 24 fixed to the bottom portion 12b, and a steering wheel 26 attached to the front portion 12d. Although not illustrated, another member (for example, a roof or a front lamp) may be fixed to the body portion 12a.

The seat 18 includes a seating surface portion 18a and a backrest portion 18b such that a driver can perform depression adjustment operation of the accelerator pedal 20 and the brake pedal 22 and a steering operation of the steering wheel 26 while the driver is in a seated posture.

The accelerator pedal 20 adjusts an output state of a drive motor that rotationally drives the driving wheels (the wheels 14 for rear wheels) by adjusting a depression amount by the driver. The brake pedal 22 adjusts a braking state caused by a mechanical brake provided for the wheels 14 by adjusting a depression amount by the driver.

The steering wheel 26 is a member rotatable in the right direction and the left direction. A rotation angle (also referred to as an input angle) of the steering wheel 26 with respect to a predetermined rotation position indicating straight traveling (also referred to as a straight traveling rotation position) is an example of turning target information indicating a target direction of turning and a target degree of turning. In the present embodiment, "input angle=zero" indicates straight traveling, "input angle>zero" indicates right turning, and "input angle<zero" indicates left turning. A magnitude (that is, an absolute value) of the input angle indicates the target degree of turning. The driver can input the turning target information by operating the steering wheel 26. The connection between the steering wheel 26 and a steering mechanism that steers the wheels 14 on a front wheel side may be implemented by a mechanical steering mechanism that is mechanically connected or may be implemented by a steering by-wire that is electrically connected.

A direction sensor 28 is fixed to a part of the vehicle body 12, for example, the rear wall portion 12e. The direction sensor 28 is a sensor that measures a roll angle and a yaw angular velocity of the vehicle body 12. The direction sensor 28 includes an acceleration sensor 30, a gyro sensor 32, and a control unit 34. The acceleration sensor 30 is a sensor that detects acceleration in any direction and is, for example, a three-axis acceleration sensor. The direction of the acceleration detected by the acceleration sensor 30 is referred to as a detection direction. In a state in which the lean vehicle 10 is stopped, the detection direction is the same as the vertically downward direction DD. The gyro sensor 32 is a sensor that detects an angular velocity around a rotation axis in any direction and is, for example, a three-axis angular velocity sensor. The control unit 34 specifies the roll angle and the yaw angular velocity by using a signal from the acceleration sensor 30, a signal from the gyro sensor 32, and for example, a signal from a velocity sensor 36 disposed in the front wheel unit 16F. The control unit 34 is, for example, a data processing device including a computer. These sensors implement an inertial measurement unit (IMU) and can acquire an actual tilt state (actual lean angle) of the lean vehicle 10 during traveling.

First, the rear wheel unit 16R mounted on the lean vehicle 10 will be described.

As illustrated in FIG. 1, in the lean vehicle 10, the rear wheel unit 16R disposed on a back direction DB side of the rear wall portion 12e of the vehicle body 12 includes a rear connection device 38A that connects the wheels 14 on a rear wheel side and the vehicle body 12. An example is illustrated in which the lean vehicle 10 illustrated in FIG. 1 rotationally drives the wheels 14 on the rear wheel side by a power transmission mechanism such as a drive motor 40 and a speed reduction mechanism 42. The rear wheel unit 16R includes a battery 44 that supplies power to the drive motor 40, a lean motor (a lean drive unit for driving a lean mechanism) of a lean unit to be described later, and various devices mounted on the lean vehicle 10. Therefore, a weight of the vehicle body 12 of the lean vehicle 10 according to the present embodiment is distributed more to a rear wheel unit 16R side including the lean unit than to a front wheel unit 16F side (a suspension-mounted side to be described later) not including the lean unit. As a result, more lean motor torque generated by the lean unit can be transmitted to a road surface (the ground GL), and posture control performance by the lean unit can be improved. The drive motor 40 is rotationally controlled according to the depression amount of the accelerator pedal 20 and rotationally drives the wheels 14 on the rear wheel side via the speed reduction mechanism 42. The power transmission mechanism using the drive motor 40 and the speed reduction mechanism 42, the battery 44, and the like can use a well-known configuration and detailed description will be omitted.

The rear wheel unit 16R and the vehicle body 12 are connected by a rear connection bar 46A. In the rear connection bar 46A, an end portion 46Aa on a vehicle body 12 side is pivotably connected to the vehicle body 12, and an end portion 46Ab on a rear wheel unit 16R side is fixed to the rear wheel unit 16R. A rear spring member 48 that functions as a suspension is interposed between an intermediate portion of the rear connection bar 46A and the vehicle body 12. As a result, the rear wheel unit 16R (the wheels 14 that are the rear wheels) and the vehicle body 12 can move (pivot) with respect to each other in an up-down direction. For example, when the vehicle travels on uneven ground GL, the rear wheel unit 16R mainly displaces in the up-down direction, thereby reducing the transmission of vibrations in the up-down direction to the vehicle body 12 side. In the case of the configuration of FIG. 1, there is only one rear spring member 48 at a substantially central portion in the vehicle width direction, and the rear spring member 48 has no roll stiffness. Therefore, the rear wheel unit 16R of the lean vehicle 10 according to the present embodiment has no configuration in which the roll stiffness is generated by a spring element. The front wheel unit 16F (a front connection mechanism 38B to be described later) and the vehicle body 12 are connected by a front connection bar 46B. In the front connection bar 46B, an end portion 46Ba on the vehicle body 12 side is fixed to the vehicle body 12, and an end portion 46Bb on the front wheel unit 16F side is fixed to the front wheel unit 16F.

Figure 2:
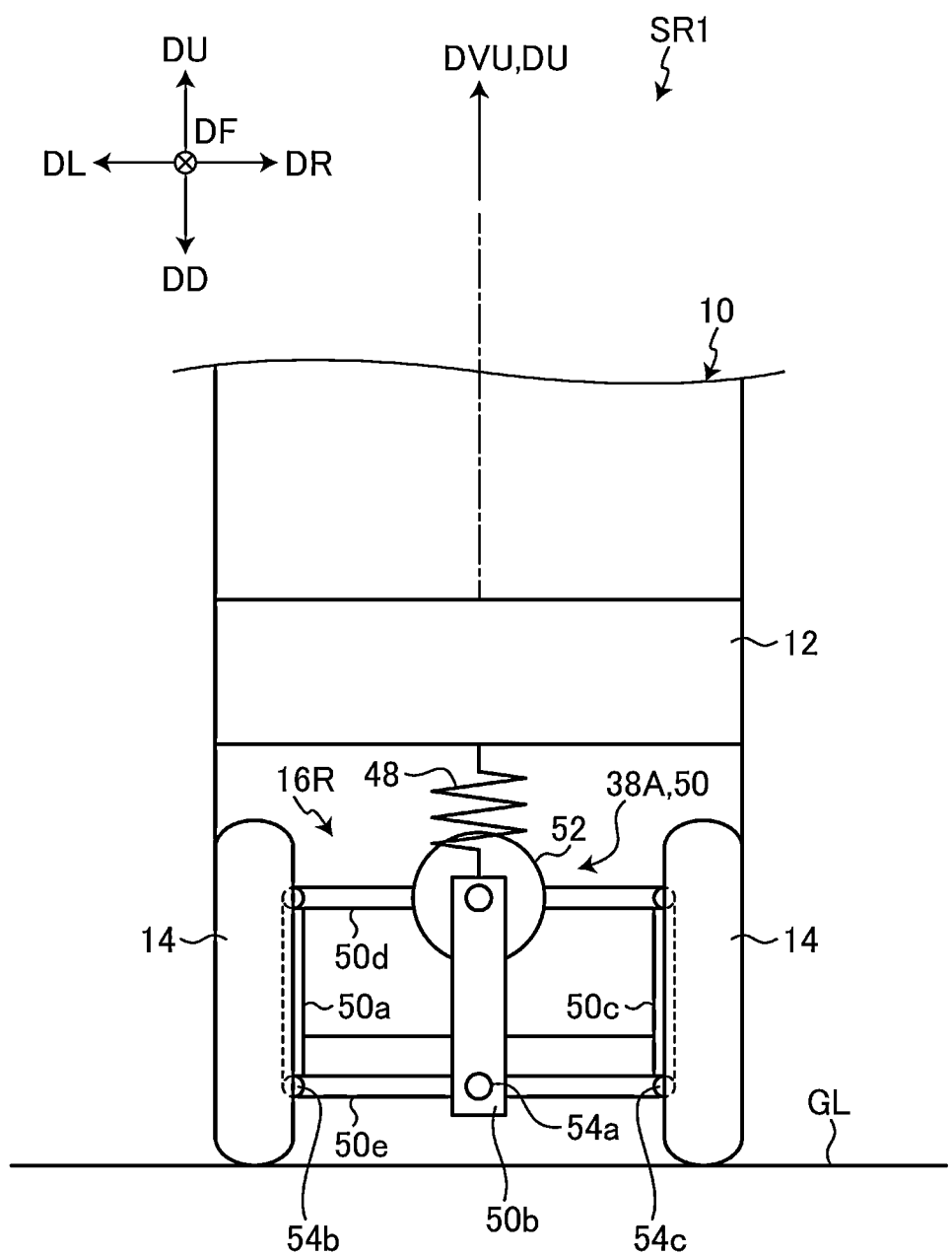
FIG. 2 is an exemplary and schematic image view illustrating a state in which the lean vehicle is not tilted in a vehicle width direction when the lean vehicle according to the embodiment is viewed from a rear side.
Figure 3:
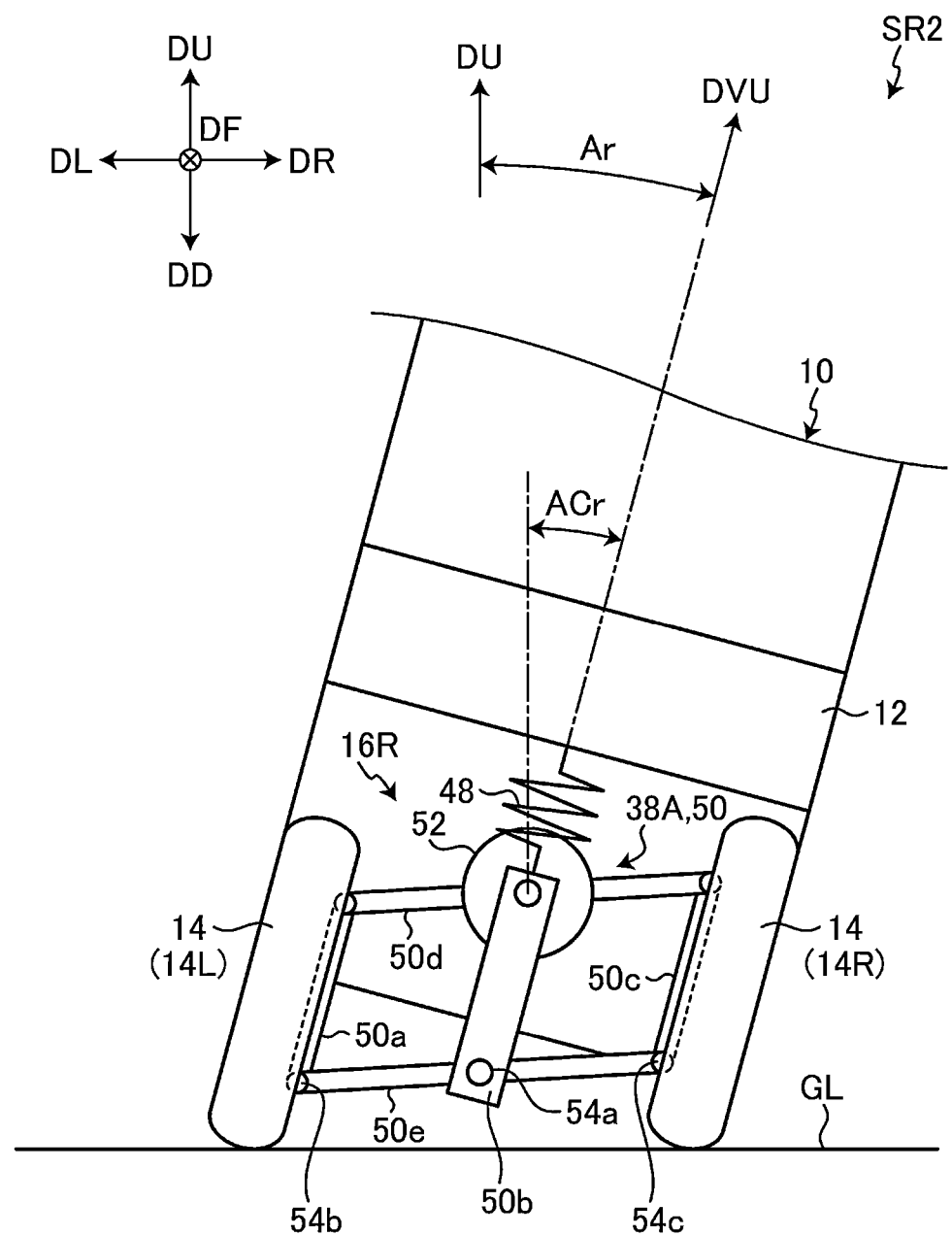
FIG. 3 is an exemplary and schematic image view illustrating a state in which the lean vehicle is tilted in the vehicle width direction (turning inward direction) when the lean vehicle according to the embodiment is viewed from the rear side.

FIG. 2 is an exemplary and schematic image view illustrating a state in which the lean vehicle 10 is not tilted in the vehicle width direction when the lean vehicle 10 is viewed from a rear side. FIG. 3 is an exemplary and schematic image view illustrating a state in which the lean vehicle 10 is tilted in the vehicle width direction (a turning inward direction) when the lean vehicle 10 is viewed from the rear side. In FIGS. 2 and 3, to facilitate understanding of the behaviors of the lean vehicle 10, illustration of the power transmission mechanism such as the drive motor 40 and the speed reduction mechanism 42 of the rear connection device 38A is omitted.

As described above, the rear connection device 38A connects two of the wheels 14 (rear wheels) and the vehicle body 12. The rear connection device 38A includes the lean unit. The lean unit includes a rear link mechanism 50 that functions as a lean mechanism (a mechanism that tilts the lean vehicle 10 in the turning inward direction) and a lean motor 52 that functions as a lean drive unit attached to the rear link mechanism 50.

The rear link mechanism 50 is a so-called parallel link and has a function of relatively tilting the rear wheel unit 16R (wheel unit) and the vehicle body 12 with respect to the ground in the turning inward direction. The rear link mechanism 50 includes three vertical link members 50a, 50b, and 50c arranged in order in the right direction DR and two lateral link members 50d and 50e arranged in order in the downward direction DD. As illustrated in FIG. 2, when the lean vehicle 10 is standing upright without being tilted on the horizontal ground GL (that is, the ground GL perpendicular to the vertically upward direction DU) (a posture SR1), the vertical link members 50a, 50b, and 50c are parallel to a vertical direction, and the lateral link members 50d and 50e are parallel to a horizontal direction. The two vertical link members 50a and 50c and the two lateral link members 50d and 50e form a parallel quadrilateral link mechanism. The vertical link member 50b connects central portions of the two lateral link members 50d and 50e. The vertical link members 50a, 50b, and 50c and the lateral link members 50d and 50e are formed of, for example, metal.

The rear link mechanism 50 includes bearings that rotatably connect a plurality of link members. For example, a bearing 54a rotatably connects the vertical link member 50b and the lateral link member 50e. A bearing 54b rotatably connects the vertical link member 50a and the lateral link member 50e. A bearing 54c rotatably connects the vertical link member 50c and the lateral link member 50e. Other link members are rotatably connected by bearings in the same manner. Rotation axes of the bearings 54a, 54b, and the like that connect the link members extend from the back direction DB side toward the front direction DF side (in the present embodiment, the rotation axes are parallel to the front direction DF). Two connected link members are relatively rotatable around the rotation axis within a predetermined angle range (for example, a range of less than 180 degrees). According to this structure, the rear link mechanism 50 can implement a structure of relatively tilting the rear wheel unit 16R and the vehicle body 12 with respect to the ground GL in the turning inward direction (the vehicle width direction). For example, when the lean vehicle 10 turns, as illustrated in FIG. 3, the lean vehicle 10 is tilted in the turning inward direction (the right direction DR) against a centrifugal force generated in the turning outward direction (the left direction DL). When the vehicle body is tilted in the turning inward direction to resist the centrifugal force, the turn of the lean vehicle 10 is stable. However, as the centrifugal force increases and the vehicle body 12 swings in the turning outward direction, the stability decreases. Therefore, to continue a good turn, it is necessary to take a posture of intentionally tilting the lean vehicle 10 toward an inside of the turn. Therefore, the rear link mechanism 50 can improve the posture stability of the lean vehicle 10 during the turn by intentionally tilting the lean vehicle 10 in the turning inward direction by the lean motor 52.

The lean motor 52 is an example of a drive device configured to drive the rear link mechanism 50 and is, for example, an electric motor. The lean motor 52 is connected to, for example, the vertical link member 50b and the lateral link member 50d on the upper side. The lean motor 52 rotates the lateral link member 50d with respect to the vertical link member 50b. Accordingly, the wheels 14 (the vehicle body 12) are tilted in the turning inward direction (that is, the right direction or the left direction in the vehicle width direction). Such a tilting movement is also referred to as a roll movement. The lean motor 52 and the vertical link member 50b may be connected via gears. The lean motor 52 and the lateral link member 50d may be connected via gears. Hereinafter, a torque generated by the lean motor 52 is also referred to as a lean motor torque. The lean motor torque rolls the vehicle body 12. That is, it is possible to implement control of relatively tilting the rear wheel unit 16R and the vehicle body 12 with respect to the ground GL in the turning inward direction. In another embodiment, the lean motor may be fixed to the rear wheel unit 16R, and an output side (rotation axis side) of the lean motor may be connected to the vehicle body 12. In this case, by relatively tilting the rear wheel unit 16R and the vehicle body 12, the rear wheel unit 16R and the vehicle body 12 may be relatively tilted with respect to the ground GL in the turning inward direction.

The posture SR1 illustrated in FIG. 2 indicates a state in which the lean vehicle 10 is standing upright, and a posture SR2 illustrated in FIG. 3 indicates a state in which the lean vehicle 10 is tilted with respect to the horizontal ground GL. As indicated by the posture SR1, when the lateral link member 50d is orthogonal to the vertical link member 50b, the wheels 14 which are the rear wheels stand upright with respect to the horizontal ground GL. The entire lean vehicle 10 including the vehicle body 12 stands upright with respect to the ground GL. A vehicle body upward direction DVU in FIG. 2 is an upward direction of the vehicle body 12. In a state in which the lean vehicle 10 is not tilted, the vehicle body upward direction DVU is the same as the upward direction DU. In the present embodiment, an upward direction determined in advance for the vehicle body 12 is used as the vehicle body upward direction DVU.

When the lean vehicle 10 in the posture SR1 is traveling straight, if the ground GL is uneven, the wheels 14 are displaced in the up-down direction by a parallel movement operation of the rear link mechanism 50 in the up-down direction, and the rear wheel unit 16R (the rear link mechanism 50) can move (pivot) in the up-down direction with respect to the vehicle body 12 due to cooperation between the rear connection bar 46A and the rear spring member 48. As a result, when the lean vehicle 10 travels on the uneven ground GL, the transmission of the vibrations in the up-down direction to the vehicle body 12 side is reduced, which contributes to improved traveling stability.

In contrast, as illustrated in the posture SR2 of FIG. 3, when the vertical link member 50b rotates clockwise with respect to the lateral link member 50d in the rearview, a wheel 14R that is a right rear wheel relatively moves in a vehicle body upward direction DVU side with respect to the vehicle body 12, and a wheel 14L that is a left rear wheel moves to an opposite side. Therefore, in a state in which the wheels 14R and 14L, which are rear wheels, are in contact with the ground GL, the wheels 14L and 14R and therefore the vehicle body 12 are tilted to the right direction DR side with respect to the ground GL. For example, the vehicle body 12 can be tilted in the turning inward direction (the right direction DR) to balance with the centrifugal force generated in the turning outward direction when the lean vehicle 10 turns right. In this case, an amount of tilting the vehicle body 12 in the turning inward direction can be adjusted as appropriate by controlling the lean motor 52. When the vertical link member 50b rotates counterclockwise with respect to the lateral link member 50d, the vehicle body 12 is tilted toward the left direction DL side. That is, the vehicle body 12 can be tilted to balance with the centrifugal force in the same manner at the time of left turning.

In the posture SR2 illustrated in FIG. 3, the vehicle body upward direction DVU is tilted to the right direction DR side with respect to the upward direction DU. Hereinafter, an angle between the upward direction DU and the vehicle body upward direction DVU when the lean vehicle 10 is viewed facing the front direction DF is referred to as a roll angle Ar or a tilt angle Ar. Here, "Ar>zero" indicates a tilt toward the right direction DR side, and "Ar<zero" indicates a tilt toward the left direction DL side. The roll angle Ar of the vehicle body 12 can be referred to as the roll angle Ar of the lean vehicle 10 including the vehicle body 12.

FIG. 3 illustrating the posture SR2 illustrates a rear control angle ACr of the rear link mechanism 50. The rear control angle ACr indicates an angle of an orientation of the vertical link member 50b with respect to an orientation of the lateral link member 50d. In the rear view illustrating the posture SR2, "ACr=zero" indicates that the vertical link member 50b is perpendicular to the lateral link member 50d. "ACr>zero" indicates a state in which the vertical link member 50b rotates clockwise with respect to the lateral link member 50d from the state of "ACr=zero". Although not illustrated, "ACr<zero" indicates a state in which the vertical link member 50b rotates counterclockwise with respect to the lateral link member 50d from the state of "ACr=zero". As illustrated, when the lean vehicle 10 is located on the horizontal ground GL (that is, the ground GL perpendicular to the vertical upward direction DU), the rear control angle ACr is approximately the same as the roll angle Ar.

As to be described later, the front wheel unit 16F includes a passive suspension 54 and a link mechanism that can tilt the wheels 14 which are the front wheels in the vehicle width direction while generating larger roll stiffness as the tilt (roll) of the vehicle body 12 increases. Therefore, the vehicle body 12 can be tilted in the vehicle width direction with respect to the ground even on the front wheel side. That is, the lean vehicle 10 can adjust the posture of the vehicle body 12 in the vehicle width direction according to a traveling state or a road surface state and can change the posture to a posture suitable for traveling.

As described above, the rear link mechanism 50 on the rear wheel side can tilt (roll) the vehicle body 12 in the turning inward direction by the lean motor 52 and can maintain a balance with the centrifugal force generated at the time of turning. In this case, the wheels 14 on the front wheel side can be rolled by the roll in the same manner.

The rear link mechanism 50 and the link mechanism on the front wheel side to be described later are examples of a tilting device (also referred to as a front tilting device or a rear tilting device) configured to tilt the vehicle body 12 in the vehicle width direction of the lean vehicle 10. The lean motor 52 (also referred to as the rear drive device) is an example of the drive device configured to generate a driving force (that is, a lean motor torque) for driving the rear tilting device. The driving force of the rear drive device is a force for rolling the vehicle body 12 in the turning inward direction with respect to the wheels 14 that are a pair of rear wheels.

The rear wheel unit 16R may include a lock mechanism (not illustrated) that stops the movement of the rear link mechanism 50. By operating the lock mechanism, the rear control angle ACr can be fixed. As a result, for example, when the lean vehicle 10 is parked, the rear control angle ACr can be fixed to zero to stabilize a parking posture.

Figure 4:
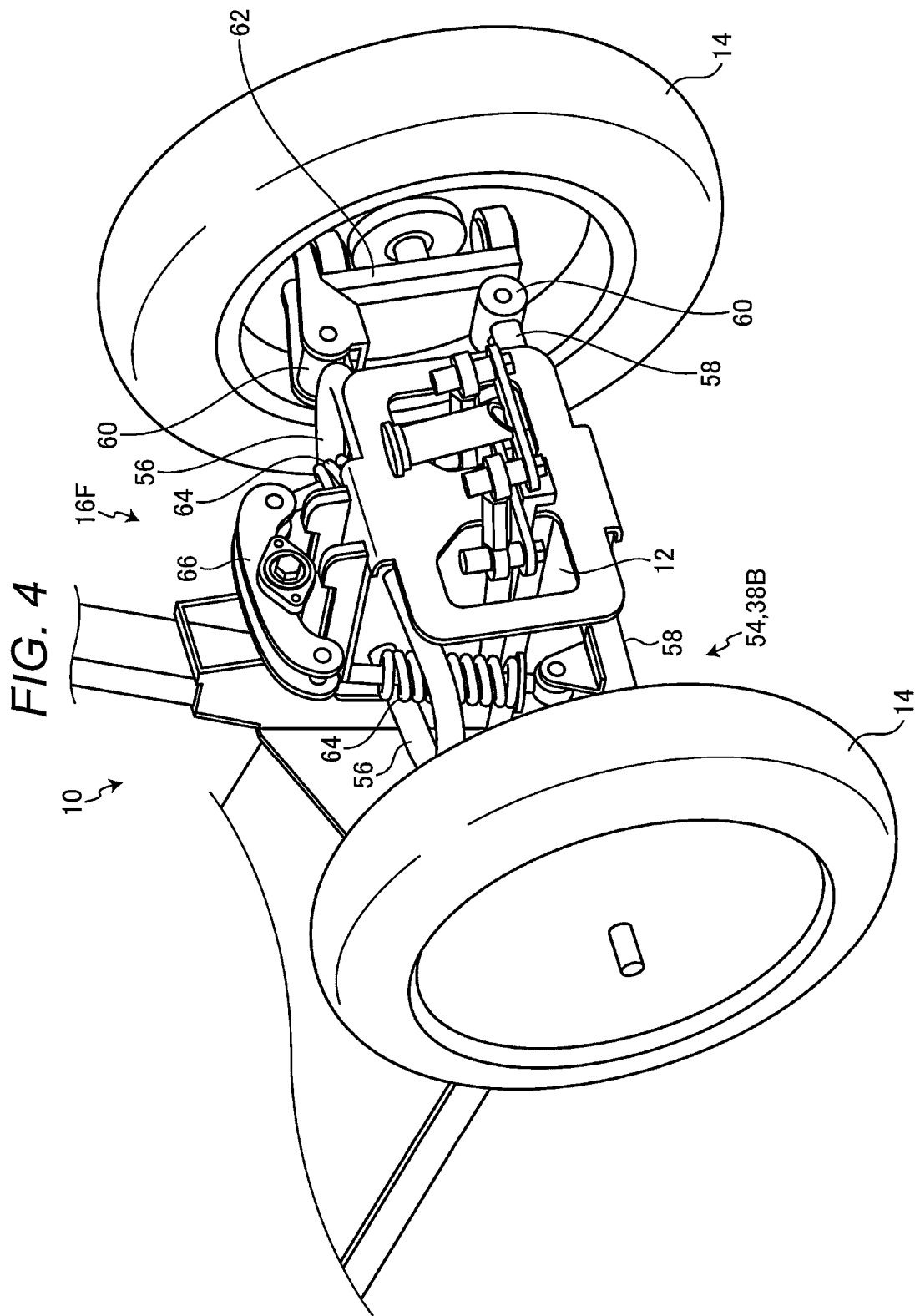
FIG. 4 is an exemplary and schematic perspective view illustrating a configuration of a passive suspension provided on front wheels of the lean vehicle according to the embodiment.

Next, the front wheel unit 16F will be described. FIG. 4 is an exemplary and schematic perspective view illustrating a configuration of the passive suspension 54, which is the link mechanism on the front wheel side (also referred to as a front connection mechanism 38B) included in the front wheel unit 16F and is provided on the front wheel side of the lean vehicle 10. FIG. 4 illustrates basic operations of the passive suspension 54, and illustrations of members not involved in the description are omitted.

The passive suspension 54 (the front connection mechanism 38B) is, for example, a well-known double wishbone type suspension, and includes upper arms 56, lower arms 58, ball joints 60 (only one side is illustrated), hub knuckles 62 (only one side is illustrated), and shock absorbers 64.

As described above, a basic structure of the double wishbone type passive suspension 54 has a well-known structure, and a detailed description thereof is omitted. A pair of upper arm 56 and lower arm 58 spaced apart in a vehicle height direction are provided in each of left and right wheels 14. In the upper arm 56 and the lower arm 58, end portions thereof far from the wheel 14 are pivotably connected to a part of the vehicle body 12, and end portions thereof close to the wheel 14 are pivotably connected, via the ball joint 60, to the hub knuckle 62 connected to the wheel 14. One end side of the hub knuckle 62 is pivotably connected to the upper arm 56 and the other end side of the hub knuckle 62 is pivotably connected to the lower arm 58, allowing a swing in the vehicle width direction around approximately a central portion of the hub knuckle 62 and allowing the wheel 14 to be tilted in the vehicle width direction. The shock absorber 64 generates the roll stiffness by expanding and contracting and generates a force against the centrifugal force at the time of turning, that is, a force for preventing the lean vehicle 10 from being swung in the turning outward direction. In the case of FIG. 4, one end side (lower end side) of the shock absorber 64 is pivotably connected to the lower arm 58. In another embodiment, one end side (lower end side) of the shock absorber 64 may be connected to the upper arm 56.

A seesaw arm 66 extending in the vehicle width direction is connected to the other end side (upper end side) of the shock absorber 64 in the passive suspension 54 according to the present embodiment. The seesaw arm 66 is, for example, an arc-shaped plate member and has two end portions pivotably connected to the upper end sides of the left and right shock absorbers 64, respectively. A central portion of the seesaw arm 66 is pivotably connected to a part of the vehicle body 12. The seesaw arm 66 has a function of enabling tilting of the lean vehicle 10 by swinging before the expansion and contraction of the shock absorber 64. That is, the start of the expansion and contraction operation of the shock absorber 64 can be delayed. As a result, the lean vehicle 10 can tilt the wheels 14 (the front wheels) in the turning inward direction (the vehicle width direction) of the lean vehicle 10 by an expansion and contraction amount of the shock absorbers 64 and a swing amount of the seesaw arm 66. In other words, it is possible to expand a tilt amount of the wheel 14 (the front wheel) to be equal to or larger than an expansion and contraction capability of the shock absorber 64, thereby contributing to an expansion of a range within which the vehicle posture is stabilized at the time of turning.

The passive suspension 54 including the seesaw arm 66 can prevent the roll stiffness from being generated in a first region (first angle range) from the start of the tilt of the vehicle body 12 to a predetermined angle (to a swing range of the seesaw arm 66). The seesaw arm 66 (the passive suspension 54) can generate the roll stiffness by a spring force of the shock absorber 64 in a second region (a second angle range) in which the vehicle body 12 is further tilted from the first region. That is, the passive suspension 54 according to the present embodiment has different roll stiffness characteristics according to a degree of tilt of the lean vehicle 10. That is, in a region (the first region) in which the tilt is small, the roll stiffness is reduced to give priority to the ease of tilt (ease of lean), and in a region (the second region) in which the tilt is large, the roll stiffness is set to be high by giving priority to roll prevention. As a result, when a turning radius is large or a vehicle speed is small at the time of turning, and when the centrifugal force generated in the turning outward direction is small, a lean posture of the lean vehicle 10 is easily implemented. When the centrifugal force is large, it is possible to reduce the instability of the tilt posture of the lean vehicle 10 (the wheels 14 on the front wheel side) by the increased roll stiffness (to improve a posture maintaining force).

Figure 5:
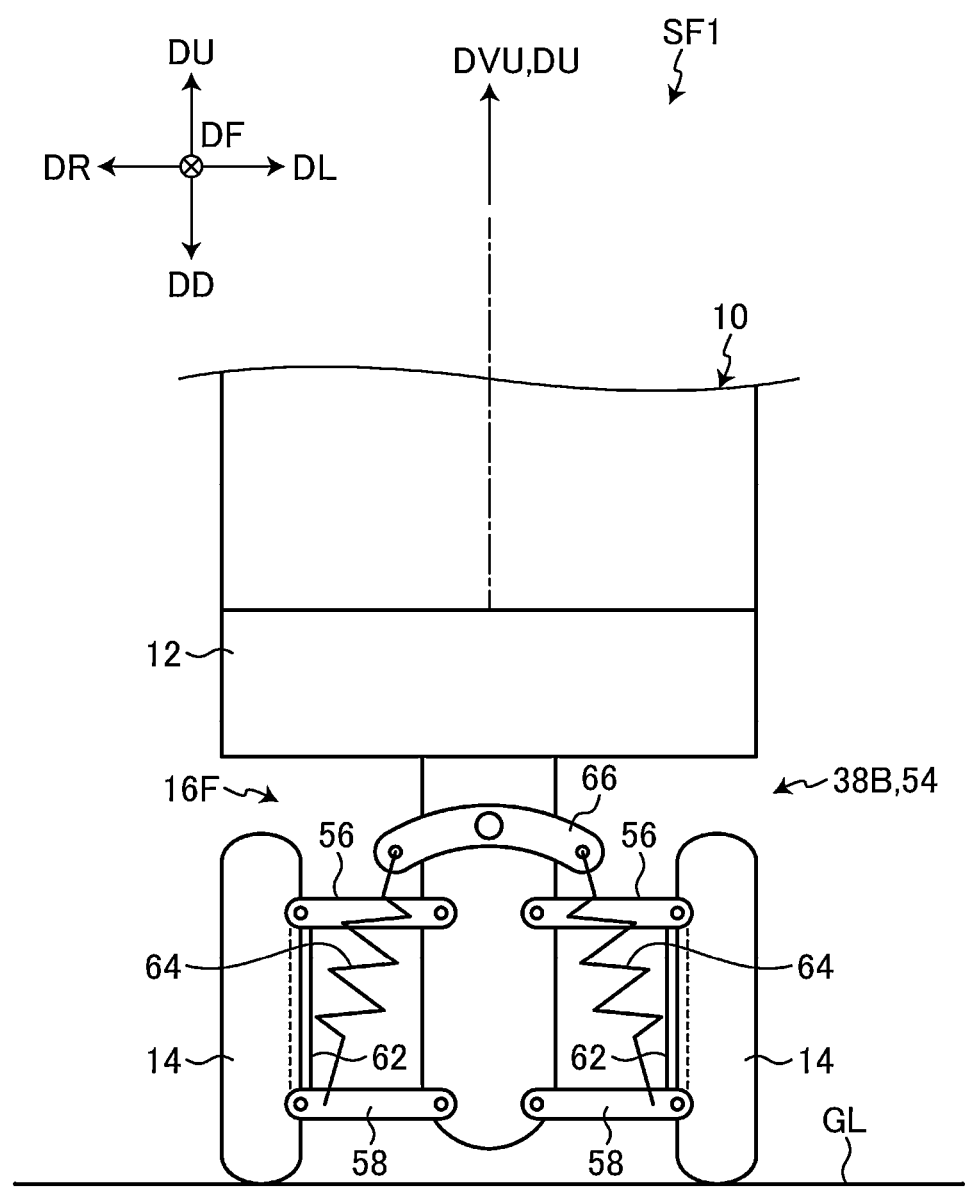
FIG. 5 is an exemplary and schematic image view illustrating a state in which the lean vehicle is not tilted in the vehicle width direction when the lean vehicle according to the embodiment is viewed from a front side.
Figure 6:
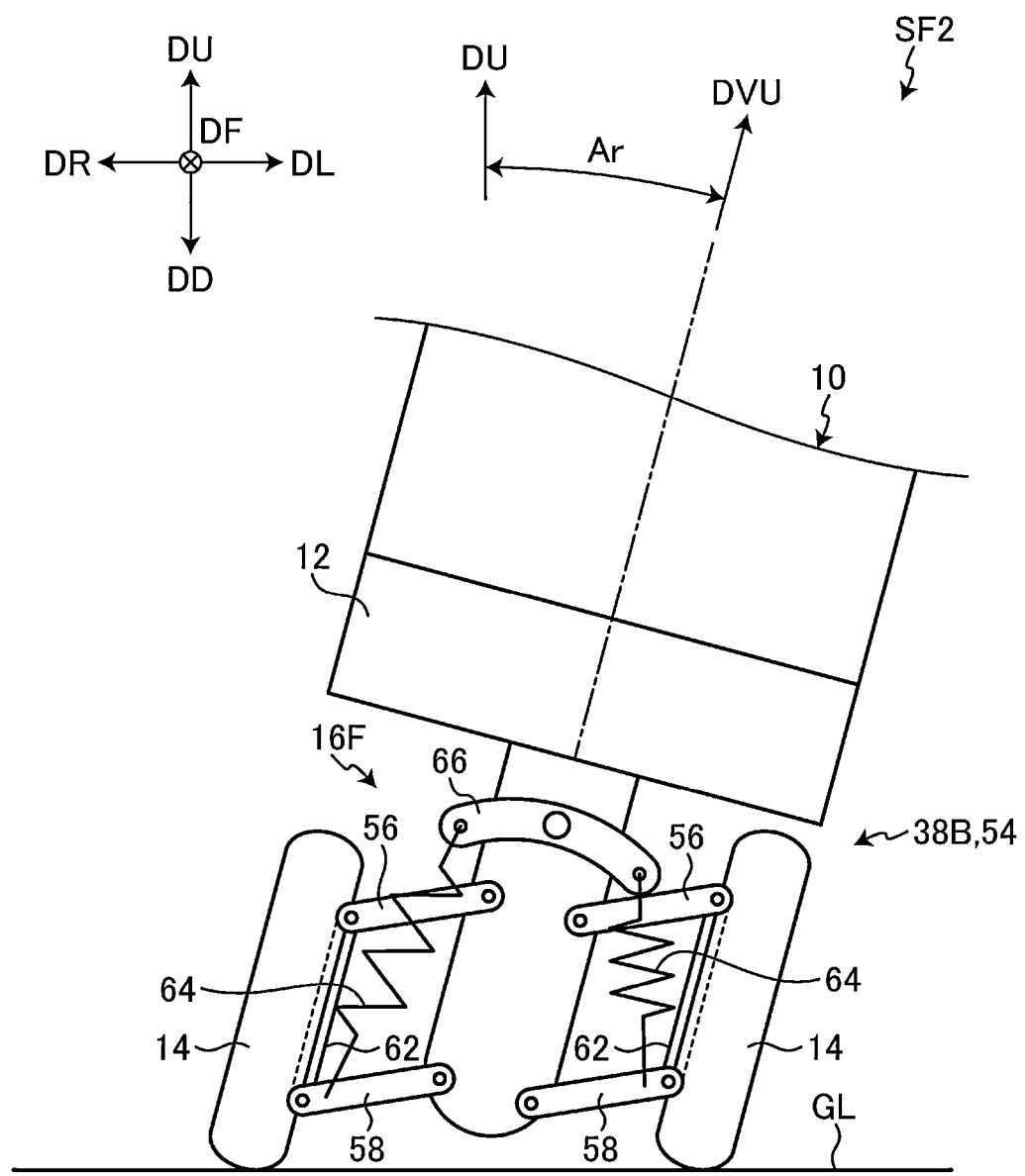
FIG. 6 is an exemplary and schematic image view illustrating a state in which the lean vehicle is tilted in the vehicle width direction (turning inward direction) when the lean vehicle according to the embodiment is viewed from the front side.

Operations of the front wheel unit 16F configured in this way will be described with reference to FIGS. 5 and 6. FIG. 5 is an exemplary and schematic image view illustrating a state in which the lean vehicle 10 is not tilted in the vehicle width direction (the turning inward direction) when the lean vehicle 10 is viewed from the front side. FIG. 6 is an exemplary and schematic image view illustrating a state in which the lean vehicle 10 is tilted in the turning inward direction when the lean vehicle 10 is viewed from the front side. In FIGS. 5 and 6, to facilitate understanding of the behaviors of the lean vehicle 10, the upper arms 56, the lower arms 58, the hub knuckles 62, the shock absorbers 64, and the seesaw arm 66 of the front wheel unit 16F (the passive suspension 54) are schematically illustrated, and other configurations are not illustrated. FIGS. 2 and 3 are views of the lean vehicle 10 as viewed from the rear side. FIG. 3 is a view illustrating that the lean vehicle 10 is turning to the right. In contrast, FIGS. 5 and 6 are views of the lean vehicle 10 as viewed from the front side. FIG. 6 is a view illustrating that the lean vehicle 10 is turning to the left.

As described above, the upper arms 56 and the lower arms 58 implementing the passive suspension 54 connect the wheels 14 (front wheel) and the vehicle body 12. The left and right upper arms 56 and the left and right lower arms 58 pivot in opposite directions, thereby displacing the wheels 14 in the up-down direction according to the unevenness of the ground GL. That is, transmission of an influence of the unevenness of the ground GL to the vehicle body 12 is reduced, which contributes to the improvement of riding comfort. The upper arms 56 and the lower arms 58 pivot in the same direction, thereby tilting the wheels 14 and tilting the vehicle body 12 with respect to the ground GL in the turning inward direction (the vehicle width direction) in the same manner as the rear wheel unit 16R (the rear link mechanism 50).

For example, as in a posture SF1 in FIG. 5, when the lean vehicle 10 stands upright without being tilted on the horizontal ground GL (that is, the ground GL perpendicular to the vertically upward direction DU), the upper arm 56 and the lower arm 58 are parallel to the horizontal direction. In this case, the shock absorber 64 is in a steady state, and basically no spring force is generated. When the ground GL is uneven, when the left and right wheels 14 are displaced simultaneously in the upward direction or the downward direction, the left and right upper arms 56 and the left and right lower arms 58 pivot in opposite directions to absorb a displacement amount caused by the unevenness. When the ground GL is uneven, when one of the wheels 14 is displaced in the upward direction or the downward direction due to the unevenness, the upper arms 56 and the lower arms 58 pivot in the same direction according to the unevenness and absorb the displacement amount caused by the unevenness. In this case, when a degree of the unevenness is relatively small and a pivoting amount of the lower arm 58 is within the swing range of the seesaw arm 66 to which the shock absorbers 64 are connected, the shock absorbers 64 do not expand and contract, and the displacement amount caused by the unevenness is absorbed only by the swing of the seesaw arm 66 to stabilize the posture of the vehicle body 12. On the other hand, when the degree of the unevenness exceeds the swing range of the seesaw arm 66, the expansion and contraction of the shock absorbers 64 is started, and the displacement amount caused by the unevenness is absorbed by the swing of the seesaw arm 66 and the expansion and contraction of the shock absorbers 64.

Next, with reference to FIG. 6, behaviors of the front wheel unit 16F (the passive suspension 54) when the lean vehicle 10 turns will be described. As described above, when the lean vehicle 10 turns, for example, in the left direction DL, a centrifugal force is generated in the turning outward direction (the right direction DR). Therefore, to cancel the centrifugal force, it is necessary to tilt the lean vehicle 10 toward the turning inside. In this case, the left and right upper arms 56 and the left and right lower arms 58 pivot in the same direction in the front wheel unit 16F, thereby tilting the wheels 14 and tilting the vehicle body 12 with respect to the ground GL in the turning inward direction (the vehicle width direction).

For example, as illustrated in a posture SF2 illustrated in FIG. 6, when the lean vehicle 10 turns left, the lean vehicle 10 needs to be tilted in the left direction, which is the turning inside, to take a balance with the centrifugal force generated in the turning outward direction. As described above, the lean vehicle 10 can be intentionally tilted (leaned) in the turning inward direction by driving the lean motor 52 on the rear wheel unit 16R side. In this case, the drive control of the lean motor 52 is executed based on a target tilt angle (turning target information, target lean angle) calculated based on the vehicle speed of the lean vehicle 10 and the rotation angle (input angle) of the steering wheel 26 and a lean angle actually obtained from the inertial measurement unit (actual lean angle). In this case, the target lean angle and the actual lean angle may differ according to the traveling state or the road surface state. Therefore, the lean vehicle 10 implements an ideal turning posture of the lean vehicle 10 by controlling the lean motor torque generated by the lean motor 52 of the rear wheel unit 16R to eliminate a deviation between the target lean angle and the actual lean angle.

In the front wheel unit 16F (the passive suspension 54), in an initial stage of the tilt of the lean vehicle 10, that is, when the centrifugal force is small, when the pivoting amount of the lower arm 58 (the upper arm 56) is within the swing range (the first region) of the seesaw arm 66 to which the shock absorbers 64 are connected, the shock absorbers 64 do not expand and contract, and the tilt of the lean vehicle 10 (the wheels 14) is allowed by only the swing of the seesaw arm 66. That is, the lean motor 52 can easily implement the ideal turning posture of the lean vehicle 10 by generating the lean motor torque to implement the target lean angle. In contrast, when the centrifugal force increases and it is necessary to increase the tilt of the lean vehicle 10 in the turning inward direction, when the swing range of the seesaw arm 66 is exceeded (in the case of the second region), the expansion and contraction of the shock absorbers 64 is started to generate a repulsive force, thereby increasing the roll stiffness and resisting the increased centrifugal force. In this case, the shock absorber 64 on the turning inside is compressed, and the shock absorber 64 on the turning outside is extended. However, in this case, the repulsive force caused by the shock absorbers 64 tends to take a balance with the centrifugal force generated in the turning outward direction and is opposite to a control direction of the lean motor 52 tending to tilt the lean vehicle 10 in the turning inward direction, and the lean vehicle 10 is difficult to be tilted in the turning inward direction. That is, it may be difficult to implement the ideal turning posture of the lean vehicle 10 only by controlling the lean motor 52 to implement the target lean angle.

Here, according to the roll stiffness generated by the shock absorbers 64 on the wheel unit side on which the lean unit is not mounted, the lean motor 52 according to the present embodiment performs control to generate the lean motor torque to cancel the roll stiffness.

Figure 7:
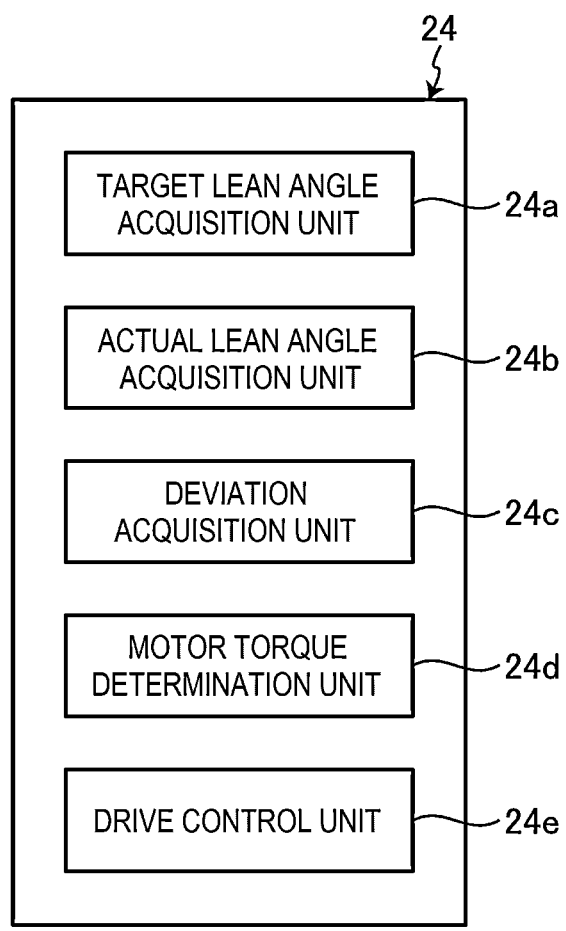
FIG. 7 is an exemplary and schematic block diagram illustrating a configuration of a control device that performs a lean control in the lean vehicle according to the embodiment.

FIG. 7 is an exemplary and schematic block diagram illustrating a configuration of the control device 24 that performs lean control in the lean vehicle 10. The control device 24 includes a target lean angle acquisition unit 24a, an actual lean angle acquisition unit 24b, a deviation acquisition unit 24c, a motor torque determination unit 24d, and a drive control unit 24e. The target lean angle acquisition unit 24a can use, for example, a map created by a test or the like in advance to acquire the target lean angle corresponding to the travel requested by the driver based on the velocity sensor 36 (the vehicle speed of the lean vehicle 10) and the rotation angle (input angle) of the steering wheel 26. The actual lean angle acquisition unit 24b can acquire the actual lean angle indicating an actual tilt state of the lean vehicle 10 at present by the inertial measurement unit included in the direction sensor 28 provided in the rear wall portion 12e of the vehicle body 12. The deviation acquisition unit 24c calculates the deviation between the acquired target lean angle and the acquired actual lean angle. Then, the motor torque determination unit 24d determines the lean motor torque to eliminate the deviation between the target lean angle and the actual lean angle, which is acquired by the deviation acquisition unit 24c. The drive control unit 24e drives and controls the lean motor 52 to output the lean motor torque determined by the motor torque determination unit 24d.

For example, when the actual lean angle is smaller than the target lean angle due to the repulsive force (the roll stiffness) generated by the expansion and contraction of the shock absorbers 64, that is, when the tilt of the lean vehicle 10 is insufficient, the lean motor 52 is corrected and controlled to generate the lean motor torque in a direction in which the tilt is increased. Conversely, when the actual lean angle is larger than the target lean angle when the road surface condition suddenly changes, that is, when the tilt of the lean vehicle 10 is too large, the lean motor 52 is corrected and controlled to generate the lean motor torque in a direction in which the tilt is reduced (the posture of the lean vehicle 10 is raised). A correction value of the lean motor 52 at this time can be determined by using, for example, the map created by a test or the like in advance. This map can be associated with, for example, the lean motor torque of the lean motor 52 for canceling the roll stiffness generated by the expansion and contraction of the shock absorbers 64.

Therefore, according to the lean vehicle 10 of the present embodiment, the ideal turning posture of the lean vehicle 10 can be implemented by controlling the lean motor 52 (the lean unit) in consideration of the repulsive force (the roll stiffness) generated by the expansion and contraction of the shock absorbers 64. As a result, it is possible to provide the lean vehicle 10 that has a simple structure in which the roll prevention by the roll stiffness of the suspension (the shock absorbers 64) of the front wheel unit 16F and the tilt control by the lean unit of the rear wheel unit 16R are performed in a balanced manner, the stable traveling performance is maintained, and the more stable lean posture can be implemented at the time of turning, and that easily realize cost reduction.

In this way, by disposing the lean unit on the wheel unit at least at one of the front position (the front wheels) and the rear position (the rear wheels) of the lean vehicle 10 and disposing the passive suspension 54 on the other wheel unit, the structure and control can be simplified compared to a configuration in which the lean units are disposed at both the front position and rear position and both are controlled, which can contribute to the cost reduction of the lean vehicle 10. Even when the lean unit is mounted on one of the front and rear wheel units and the passive suspension 54 that generates the roll stiffness is mounted on the other of the wheel units, the stable lean posture can be implemented at the time of turning while maintaining the stable traveling performance of the lean vehicle 10.

In the example illustrated in FIG. 4, an example is illustrated in which the stabilization range of the vehicle posture at the time of turning is enlarged by using the seesaw arm 66. In another embodiment, instead of the seesaw arm 66, a structure of providing no roll stiffness in a place (the first region) in which the tilt (the roll angle) of the vehicle body 12 is small may be used to obtain a similar effect. For example, by installing a passive stabilizer in a form of having an idling section, no roll stiffness may be provided in a place (the first region) in which the roll angle is small, the expansion and contraction operation of the shock absorbers 64 may be delayed (that is, the expansion and contraction begins in the second region), the overall tilt amount may be increased, and the stabilization range of the vehicle posture at the time of turning may be enlarged. Also in this case, the lean posture of the lean vehicle 10 can be easily implemented by not generating the roll stiffness in the first region when the centrifugal force generated in the turning outward direction is small. When the centrifugal force is large, by generating the roll stiffness caused by the shock absorbers 64 in the second region, it is possible to reduce the instability of the tilt posture of the lean vehicle 10 (the wheels 14 on the front wheel side) by the generated roll stiffness. As the spring element included in the passive suspension 54, those in which the generated roll stiffness changes in a stepwise manner according to the expansion and contraction state, for example, those that can generate small roll stiffness and large roll stiffness by using a variable shock absorber may be used. Also in this case, when the centrifugal force generated in the turning outward direction is small, the generated roll stiffness can be reduced, and an appropriate lean posture of the lean vehicle 10 can be easily implemented. When the centrifugal force increases, it is possible to reduce the instability of the tilt posture of the lean vehicle 10 (the wheels 14 on the front wheel side) by increasing the roll stiffness generated in the second region.

As described above, the lean vehicle 10 according to the present embodiment includes: a plurality of wheel units (rear wheel unit 16R, front wheel unit 16F) provided at least at a front position and a rear position of the vehicle body 12 and each including a pair of wheels 14 spaced apart in a vehicle width direction; a lean unit provided in the vicinity of one of the wheel units and including a lean mechanism (a mechanism configured to tilt the lean vehicle 10 in a turning inward direction) configured to relatively tilt the wheel unit and the vehicle body 12 with respect to the ground in the turning inward direction and a lean drive unit (lean motor 52) configured to drive the lean mechanism; and the passive suspension 54 (the front connection mechanism) provided on the other of the wheel units and configured to generate roll stiffness when the vehicle body 12 is tilted with respect to the ground in the vehicle width direction. According to this configuration, for example, the lean unit is disposed in one of the wheel units at least at the front position and the rear position of the vehicle body 12, and the passive suspension 54 is disposed in the other of the wheel units. Therefore, it is possible to provide the lean vehicle that has a simple structure in which the roll prevention by the roll stiffness of the passive suspension 54 and the tilt control by the lean unit can be performed in a balanced manner, the stable traveling performance can be maintained, and the more stable lean posture can be implemented at the time of turning, and that has a configuration which easily realizes cost reduction.

In the above-described embodiment, the passive suspension 54 may have different roll stiffness characteristics in a first region from a start of tilt of the vehicle body 12 to a predetermined angle and a second region in which the vehicle body 12 is further tilted from the first region. For example, the passive suspension 54 may increase the roll stiffness gradually in the first region in which the tilt of the vehicle body 12 is small and increase the roll stiffness by a change rate of the roll stiffness larger than a change rate of the first region in the second region in which the tilt exceeds that in the first region and becomes even larger. That is, the passive suspension 54 may be changed such that the roll stiffness increases as the tilt of the vehicle body 12 increases. In another embodiment, the passive suspension 54 may not generate the roll stiffness in the first region and may generate the roll stiffness in the second region in which the tilt increases. That is, the roll stiffness of the passive suspension 54 may be generated when the tilt of the vehicle body 12 (the wheels 14 on the front wheel side) exceeds a predetermined value. According to this configuration, in the first region in which the tilt is small, the roll stiffness can be reduced to give priority to the lean, and in the second region in which the tilt is large, the roll stiffness can be increased by giving priority to the roll prevention. As a result, the roll prevention by the roll stiffness of the passive suspension 54 and the tilt control by the lean unit can be performed in a balanced manner, the stable traveling performance can be maintained, and the more stable lean posture can be implemented at the time of turning.

In the above-described embodiment, the passive suspension 54 may include the upper arm 56 and the lower arm 58 that support the wheels 14, a pair of spring members (shock absorbers 64) disposed apart from each other in the vehicle width direction and each having a lower end connected to one of the lower arm 58 and the upper arm 56, and the seesaw arm 66 having end portions in the vehicle width direction connected to upper ends of the pair of spring members, respectively, and having a central portion connected to the vehicle body 12 pivotably. According to this configuration, for example, a structure can be easily implemented in which the roll stiffness is not generated to give priority to the lean in the region (the first region) in which the tilt is small and the roll stiffness is increased to give priority to the roll prevention in the region (the second region) in which the tilt is large. A structure can be easily implemented in which the tilt amount of the lean vehicle 10 is extended to be equal to or larger than the expansion and contraction capability of the spring member (the shock absorbers 64) and the stabilization range of the vehicle posture at the time of turning is enlarged.

In the above-described embodiment, a weight of the vehicle body 12 may be distributed more to the wheel unit side including the lean unit than to the wheel unit side provided with the passive suspension. According to this configuration, for example, more lean motor torque generated by the lean unit can be transmitted to the road surface (the ground GL), and posture control performance by the lean unit can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A lean vehicle comprising:
a plurality of wheel units provided at least at a front position and a rear position of a vehicle body and each including a pair of wheels spaced apart in a vehicle width direction;
a lean unit provided in a vicinity of one of the wheel units and including a lean mechanism configured to relatively tilt the wheel unit and the vehicle body with respect to a ground in a turning inward direction and a lean drive unit configured to drive the lean mechanism; and
a passive suspension provided on the other of the wheel units and configured to generate roll stiffness when the vehicle body is tilted with respect to the ground in the vehicle width direction,
wherein the passive suspension has different roll stiffness characteristics in a first region from a start of tilt of the vehicle body to a predetermined angle and a second region in which the vehicle body is further tilted from the first region.

2. The lean vehicle according to claim 1, wherein the passive suspension includes
an upper arm and a lower arm that support the wheels,
a pair of spring members disposed apart from each other in the vehicle width direction and each having a lower end connected to one of the lower arm and the upper arm, and
a seesaw arm having end portions in the vehicle width direction connected to upper ends of the pair of spring members, respectively, and having a central portion connected to the vehicle body pivotably.

3. The lean vehicle according to claim 1, wherein a weight of the vehicle body is distributed more to a wheel unit side including the lean unit than to a wheel unit side provided with the passive suspension.

* * * * *